United States Patent [19]

Pearl

[11] Patent Number: 4,725,961

[45] Date of Patent: Feb. 16, 1988

[54] METHOD AND APPARATUS FOR CUTTING PARTS FROM PIECES OF IRREGULARLY SHAPED AND SIZED SHEET MATERIAL

[75] Inventor: David R. Pearl, West Hartford, Conn.

[73] Assignee: Gerber Garment Technology, Inc., Tolland, Conn.

[21] Appl. No.: 841,582

[22] Filed: Mar. 20, 1986

[51] Int. Cl.[4] ..................... G06F 15/46

[52] U.S. Cl. ..................... 364/475; 83/71; 364/507

[58] Field of Search ............... 364/474, 475, 470, 148, 364/507; 83/71, 74, 520, 521, 522, 925 CC

[56] References Cited

U.S. PATENT DOCUMENTS

| | | | |
|---|---|---|---|
| 3,596,068 | 7/1971 | Doyle | 364/470 X |
| 3,750,507 | 8/1973 | Gerber et al. | 83/925 CC X |
| 3,761,675 | 9/1973 | Mason et al. | 364/475 X |
| 3,875,389 | 4/1975 | McFadden et al. | 364/475 |
| 4,176,566 | 12/1979 | Patterson et al. | 83/925 CC X |
| 4,178,820 | 12/1979 | Gerber | 83/925 CC X |
| 4,205,835 | 6/1980 | Gerber | 83/925 CC X |
| 4,221,974 | 9/1980 | Mueller et al. | 364/475 X |
| 4,551,810 | 11/1985 | Levine | 364/475 |

*Primary Examiner*—Joseph Ruggiero

*Attorney, Agent, or Firm*—McCormick, Paulding & Huber

[57] ABSTRACT

In an apparatus and method for use in cutting pattern parts from a plurality of irregularly shaped and sized pieces of sheet material, such as hides, a piece of sheet material to be cut is spread onto the cylindrical surface of a drum and is then first digitized and subsequently cut while remaining fixed to the drum. From the data obtained by the digitizing a representation of the hide periphery is visually displayed on the screen of a layout unit where an operator interactively arranges visual part representations selected from a computer memory store within the hide periphery representation to arrive at an acceptable layout of parts. Such layout is then converted to digital data used to cause the sheet material to be cut in accordance with the layout during the cutting step.

13 Claims, 1 Drawing Figure

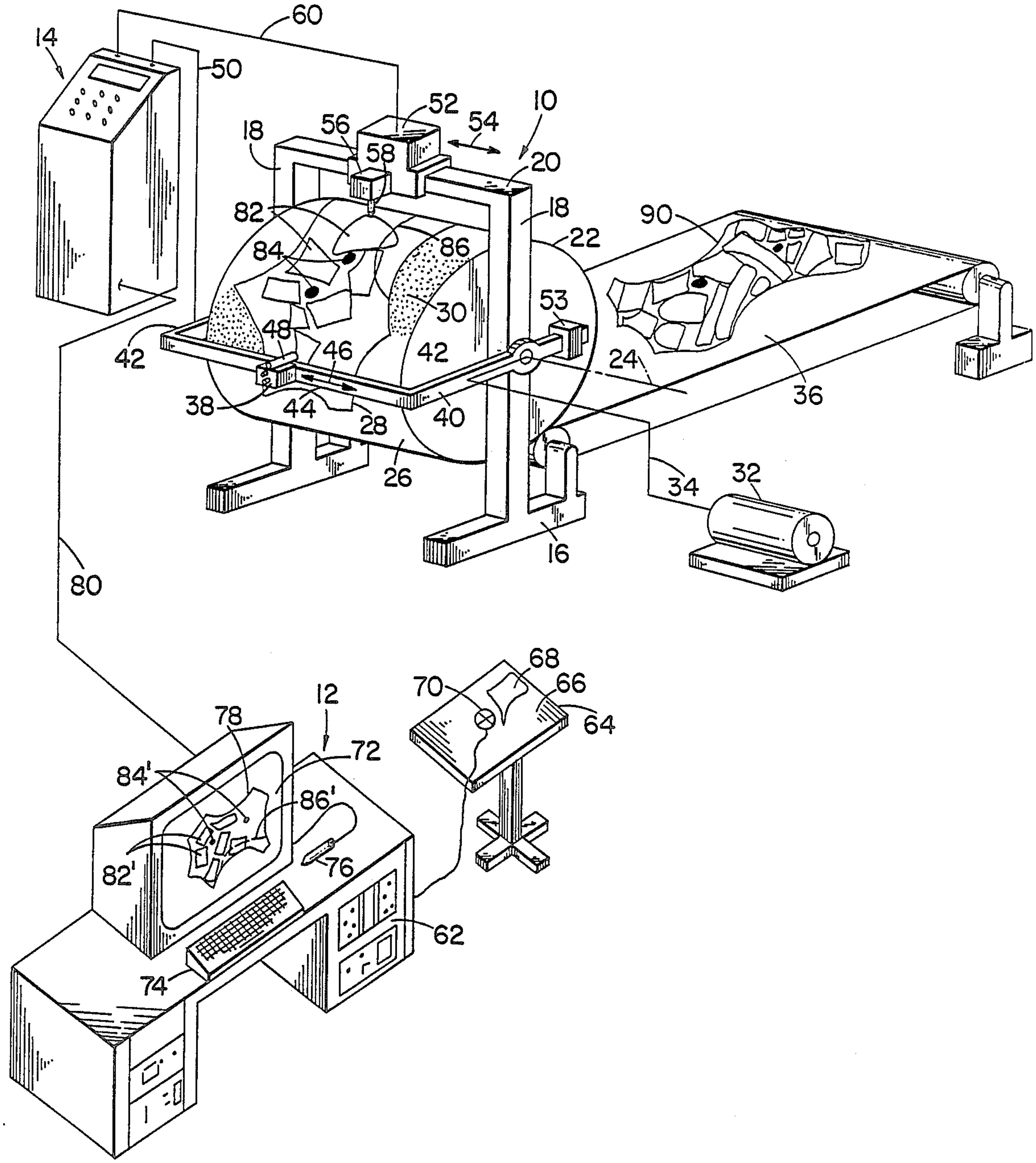
14
60
50
52
54
10
18
56
58
20
18
82
90
22
84
86
30
53
48
42
46
42
24
36
38
44
28
40
26
34
32
16
80
68
70
66
64
12
78
72
84'
86'
82'
76
62
74

METHOD AND APPARATUS FOR CUTTING PARTS FROM PIECES OF IRREGULARLY SHAPED AND SIZED SHEET MATERIAL

BACKGROUND OF THE INVENTION

This invention relates to a method and apparatus for cutting parts from irregularly shaped and sized pieces of sheet material, such as for the particular case of cutting pattern parts for use in making shoes, clothing or upholstery from the leather of animal hides, and deals more particularly with an improved method and apparatus allowing pattern parts to be cut from irregularly shaped pieces of sheet material with a low expenditure of operator and machine time, with an efficient utilization of the sheet material, with the pattern pieces cut from the sheet material avoiding blemishes in the material and, if desired, with the parts being cut from the piece of sheet material within a thickness or other textural zone having a thickness or other textural characteristic matching the thickness or other textural requirement of the part.

The method and apparatus of the invention may be used in various different mass production situations where it is necessary to cut pattern parts from a large number of pieces of sheet material which vary in size and shape, which may contain randomly appearing blemishes and which may contain irregularly shaped zones of different thickness or other textural characteristics making it impractical or impossible to cut the same layout of pattern parts from each sheet. The invention, however, was initially conceived for use with the cutting of pattern parts from leather animal hides, and it is therefore for convenience hereinafter illustrated and described in association with such an application even though there is no intention to limit its scope solely to the field of hide cutting.

Since natural animal hides, when ready for cutting, are of various sizes and irregular shape and often include randomly distributed visible blemishes or imperfections such as scars, holes, scratches and burn marks, and also often include areas or zones of differing texture, such as surface appearance, thickness and softness; and since the requirements for the pattern pieces to be cut from the hides may be that no visible blemishes appear in the cut pattern parts or appear only in noncritical areas of such parts, or that certain pattern parts may or may not be cut from certain portions of the hide having textural constraints; the problem of efficient cutting of pattern parts is to arrange the required pattern part shapes as closely nested as possible within the usable periphery of the hide, while avoiding areas of the hide which contain blemishes, while at the same time having each pattern part placed on the hide within a zone having a textural characteristic suiting a related textural requirement of the part, so that the cut parts consume a maximum area of the hide and minimize the wasted hide surface between the cut parts, and so that the cut parts are also of the proper thickness, surface appearance and/or other texture characteristic taken into account in the layout and cutting of the hide.

In the past, a typical method of cutting pattern parts from hides was for a person equipped with die cutting tools, each much like a cookie cutter and corresponding to a desired pattern part shape, to examine a hide prior to its cutting and to then successively place the dies in cutting position on the hide and die cut parts from it by applying pressure to the die against a backup surface supporting the hide. In the overall procedure involving a typical irregularly shaped hide, commonly ten square feet to seventy square feet in area, the amount of hide wasted between usable parts cut from it was difficult to control.

The object of this invention is therefore to provide an apparatus and method for optimizing the usage of a hide or other irregularly shaped piece of sheet material in the cutting of pattern parts from it. A further related object is to provide such a method and apparatus which further allows the hide to be cut to avoid blemishes in the cut parts, or to cause the blemishes to fall into noncritical areas of the parts, and which method and apparatus also allows the parts to be cut from areas of the hide having one or more texture characteristics, such as thickness, meeting a corresponding one or more textural requirements of the parts.

More specifically, the object of this invention is to provide a method and apparatus which employs computer based equipment working interactively with a human operator or operators to define for each hide to be cut, the size and shape of the hide, the location of blemishes and the location of areas or zones having differing textural characteristics, to quickly provide a layout of pattern parts to be cut from the hide in which layout the pattern parts are arranged to optimize the use of the hide while avoiding blemishes and to assign the parts to areas of the hide suiting their textural requirements, and to quickly and accurately cut the pattern parts from the hide in accordance with the layout and, if desired, to label the cut parts and then separate them from the hide waste material, the method and apparatus of the invention in the aggregate providing a more efficient utilization of the hide than in the past as well as achieving a reduction in the amount of manual labor required in comparison with past methods and apparatus.

SUMMARY OF THE INVENTION

The invention resides in a process for cutting parts from hides or other plurality of similar irregularly shaped and sized pieces of sheet material. A hide to be cut is spread on a support surface and then digitized by an associated digitizer to define the shape of its usable periphery and the periphery defining data obtained by the digitizer is then supplied to a layout unit having a screen for displaying a visual representation of the periphery. The operator then selects representations of pattern parts stored in a computer memory, displays then on the display screen and interactively arranges them within the digital representation of the hide periphery until an acceptable layout is obtained. Then data representing the acceptable layout is supplied to a cutter which cuts the hide in accordance with the layout while it remains on the same surface which supported it during the digitizing step.

The invention also resides in additionally digitizing the hide to obtain digital representation of blemishes or imperfections which appear on the hide and using the digital blemish data so obtained to provide a visual representation of the blemishes on the screen which are taken into account while arranging the pattern part representations on the screen.

The invention further resides in additionally inspecting the hide to define boundaries between areas of differing thickness or other textural characteristic and to digitize the hide along such boundary lines to provide boundary data used to cause the visual display of corresponding boundary line representations on the display screen which are taken into consideration in arranging the patter parts within the visual representation of the hide periphery.

The invention additionally resides in apparatus for carrying out the above described process with such apparatus including a digitizing and cutting unit, a layout unit and a control unit, the digitizing and cutting unit including a stationary frame, a drum supported by the frame for rotation about its central axis and having a generally cylindrical outer surface on which a hide is supported in spread condition during both the digitizing and cutting step.

As to its apparatus, the invention also resides in the digitizing and cutting unit also including a subframe carried by the stationary frame for movement about the central axis of the drum and having a beam located outwardly of and adjacent to the outer surface of the drum and extending parallel to the central axis of the drum with the digitizer being mounted on that beam for movement along its length in one coordinate direction relative to the outer drum surface.

The invention still further resides in other details of the process and apparatus as defined by the claims.

DESCRIPTION OF THE DRAWING

The drawing is a schematic perspective view showing an apparatus embodying the invention and useful in carrying out the process of the invention.

DESCRIPTION OF THE PREFERRED EMBODIMENT

Turning to the drawings, an apparatus embodying the invention is there shown to comprise in general a digitizing and cutting unit 10, a layout unit 12 and a control unit 14.

The digitizing and cutting unit 10 includes a stationary frame 16 having two upright posts 18 supporting at their upper ends an elongated beam 20. A drum 22 is supported by and between the posts 18 for rotation about its central axis 24 which is arranged horizontally. The outer surface 26 of the drum is of a cylindrical shape and is used to receive and hold a hide 28 for digitizing and cutting.

The structure of the drum 22 which forms its outer surface 26 may vary in detail and is such as to releasably hold the hide to the surface 26 while the surface 26 is penetrable to some degree by a reciprocating cutting knife and/or other tool used to cut, drill, notch or otherwise work the hide held to the surface. Adhesive or mechanical clamps may be used to hold the hide to the surface 26 and, for example, the surface 26 may be provided by a bed of foamed plastic to make the surface 26 penetrable to a tool. In the preferred and illustrated case, however, the surface 26 is formed by a bed of bristles 30 and the hide is retained on the surface 26 by a vaccum applied to its undersurface through holes in the bristle bed. For this purpose an air pump 32 is connected to the drum 22 through an air line 34 which communicates with the air openings in the bristle bed 30. The pump 32 preferably may be switched or reversed in operation to either supply a vacuum pressure or a positive pressure to the line 34. When a vacuum pressure is applied to the line 34 it is communicated to the holes in the bristle bed 30 and creates the desired vacuum pressure on the undersurface of the hide causing the hide to be held by atmospheric pressure to the drum surface 26. When a positive pressure appears in the line 34 air at positive pressure is applied through the holes in the bristle bed to the undersurface of the hide 28 to aid in removing the cut hide from the surface 26 of the drum and in moving it onto an associated unloading or take-away conveyor 36.

For digitizing a hide 26 received on the outer surface 26 of the drum 22 the digitizing and cutter unit 10 includes a digitizer 38 moveable in two coordinate directions relative to the hide 28 so as to be able to move to any point and to follow any line on the hide. The digitizer 38 is supported by a subframe 40 consisting of two arms 42 located on opposite sides of the drum 22 and supported by the posts 18 of the stationary frame 16 for rotation about the central axis 24 of the drum. Attached to the outer ends of the arms 42 is an elongated beam 44 located outwardly adjacent the drum surface 26 and extending parallel to the drum's central axis 24. The digitizer 38 is supported on the beam 44 so as to be freely slidable along its length in a direction indicated by the arrow 46 thereby moving the digitizer in one coordinate direction relative to the hide 28 on the drum surface 26. Movement of the digitizer in the other coordinate direction relative to the hide is achieved by movement of the subframe 40 and/or the drum 22 about the drum's central axis 24. The digitizer 38 includes a probe 48 moveable, by movement of the digitizer 38 in its two coordinate directions relative to the hide, to any point on or along any line on the hide, and as the probe is so moved digital encoders, not shown, provide digital signals supplied to the control unit 14 over the line 50 representing the coordinates of the points to which or the lines along which the probe is moved relative to the hide.

The digitizer and its probe 48 may be moved manually relative to the hide and the subframe 40 is counterbalanced, as shown, by one or more weights 53 so as to allow the subframe to be moved about the axis 24 of the drum with small expenditure of effort by the operator. If desired, the digitizer 38 may also include an optical line follower working in conjunction with motors for driving the digitizer in its two coordinate directions relative to the hide to allow the digitizer to automatically follow and digitize a given line or edge on the hide such as the edge defining its periphery.

For cutting or otherwise working on the hide 28 received on the drum's outer surface 26, the digitizing and cutting unit 10 includes a tool carriage 52 supported on the elongated beam 20 of the stationary frame 16 for movement along the length of that beam in the direction of the arrow 54. Carried by the tool carriage 54 is a cutter 56 having a reciprocating knife 58 which extends generally perpendicularly to the hide and penetrates slightly into the bed of bristles 30 during its reciprocating movement. In a cutting procedure the cutter 56 is moved in two coordinate directions relative to the hide 28 to follow a desired line of cut on the hide. One such coordinate direction of movement is movement of the carriage 52 along the length of the beam 20 in the direction of the arrow 54 under the control of an associated motor, not shown. The other coordinate direction of movement is movement of the drum 22 about its central axis 24 by another associated motor, not shown, the two involved motors being controlled by signals from the control unit 14 supplied through the line 60. In addition to the cutter 56 the tool carriage 52 may also include other tools such as a drill or notcher, for drilling holes in the hide or providing notch marks in the edges of the cut parts, or a labeler or other marking device for applying identifying labels or markings to each part cut from the hide.

The layout unit 12 of the apparatus shown in the drawing may be made up of components such as used in a typical system for making markers in the clothing making industry, one such system being the AM-5 Pattern Grading and Marker Making System manufactured and sold by applicant. A similar system is also shown in U.S. Pat. No. 3,887,903. In particular, the unit 12 includes a computer 62 having a memory previously loaded with digital pattern part data defining the size and shape of pattern parts to be cut from the hides. The information stored in the memory may also include the number of parts for each run to be cut in accordance with each memory resident pattern part representation and may also include for each memory resident pattern part representation information describing a thickness or other textural requirement needed for that part. The data which is stored in the computer memory and which defines the size and shape of each pattern part may be loaded into the memory by means of an associated part digitizer 64 having a surface 66 for supporting a part pattern 68 and a cursor 70 moveable along the edge of the part pattern to provide digital data defining the periphery of the part pattern.

Also included in the layout unit 12 is a display screen 72 and interactive means such as a keyboard 74 and a stylus 76 by means of which different items may be called up for display on the screen 72 and at least some of them interactively moved to different positions and orientations on the screen. In the illustrated case, the layout unit 12 functions to allow an operator to display on the screen 72 a visual representation 78 of the periphery of the particular hide 28 received at that time on the surface 26 of the drum 22, such representation 78 being the result of periphery defining data supplied to the unit 12 by the controller 14 over the line 80 and based on data obtained by the digitizer 38. In a similar way blemish defining data and/or data defining boundry lines defining zones of different textural characteristic of the hide, obtained through the use of the digitizer 38, may be supplied to the layout unit 12 through the line 80 to cause visual representations of blemishes and boundary lines to also appear on the screen 72.

Having before him the visual representation 78 of the hide periphery as well as, if used, representations of the blemishes and textural zone boundary lines, the operator of the layout unit 12 can then interactively call up pattern part representations from the computer memory and cause them to be displayed as visual representations on the screen 72. Through the use of the stylus 76 or other interactive means the operator can then move the called up visual pattern part representations to different positions within the hide periphery representation 78 until an acceptable layout of pattern parts is achieved which, in the operator's opinion, is acceptable insofar as achieving a nesting of parts utilizing a maximum amount of the usable surface area of the hide while avoiding blemishes and while also placing the parts into textural zones meeting the textural requirement if any, of each part.

Having arrived at an acceptable layout of parts the operator at the layout unit 12 then commands the unit to output digital data defining the layout. This layout data is supplied to the controller 14 and used by it to operate the digitizing and cutting unit 10 to cause the cutter 56 carried by the carriage 52 to cut parts 80 from the hide 28 in accordance with the layout, and to also cause possible other tools carried by the carriage 52 to perform functions dictated by the layout, such other tools for example possibly including a labler or marker which labels or marks each part 80 to identify it in a way useful in subsequent handling of the parts.

Having now described the illustrated apparatus comprising an embodiment of the invention its operation may be summarized as follows. The apparatus is particularly useful in cutting a large number of hides whose size and shape differ from one another. As each hide comes up for cutting it is taken by one or more handlers and spread onto the outer surface 26 of the drum 22 of the digitizing and cutting unit 10 and a vaccum is then applied through the outer surface of the drum to maintain the hide in a fixed position on the surface 26. The probe 48 of the digitizer 38 is then moved along the edge or other usable periphery of the hide 28 to provide a set of digital periphery data supplied to the controller 14. Then, if wanted, the operator of the unit 10 moves the digitizing probe 48 to blemishes such as the ones indicated at 84 and digitizes such blemishes to provide digital blemish data also supplied to the control unit 14. Still further, if it is desired to take into account the thickness of the hide, or some other textural characteristic of the hide, which varies from area to area of the hide, the operator of the unit 10 first inspects the hide while it is spread on the support surface 26 and draws one or more boundary lines, such as the indicated line 86, defining the boundary or boundaries between zones of different thickness or between zones differing with respect to some other texture characteristic and then the digitizer 38 is used to digitize all such lines to provide boundary line digital data also supplied to the control unit 14.

It should be noted that in the digitizing of the hide 26 the drum 22 may be positioned about its central axis 24 to first bring one section of the hide within a convenient range of movement of the digitizer carrying subframe 40, the digitizer then being used to digitize all needed features lying within that section. The drum then can be rotated to bring another section of the hide into a convenient range with the new section then being digitized, such section by section digitizing being repeated until the entire hide is taken care of.

The periphery data, along with the blemish and boundary line data, if any, is then supplied by the control unit 14 to the layout unit 12 where it is used to present on the screen 72 a visual representation 78 of the periphery of the hide as well as, if used, visual representations 84' of the blemishes and 84' and visual representation 86' of the boundary lines 86. Having these visual representations in front of him the operator of the layout unit 12 then, as previously mentioned, selects pattern part representations from the memory of the computer 66 and causes them to appear as visual part representations 82' on the screen 72. Then through the use of the stylus 76 or other interactive means the operator moves the visual part representations 82' to different locations and orientations within the visual representation 78 of the hide periphery until an acceptable layout of part is obtained.

After the acceptable layout of pattern parts is obtained on the screen 72 the layout unit 12 supplies data defining that layout to the controller 14 which in turn controls the cutter 56 of the cutter unit 10 to cut actual parts 82 from the hide 28 in accordance with the layout.

After the cutting step is completed the vacuum which holds the hide 26 to surface 26 of the drum is turned off and the cut hide transferred to the unloading conveyor 36, such cut hide being indicated at 90 in the drawing. To aid in this transfer of the cut hide from the drum surface 26 on to the conveyor 36, the pump unit 32 may be switched to provide air at positive pressure, rather than a vacuum, to the drum 22 during the hide unloading step so as to blow the cut hide from the surface 26 and onto the conveyor.

I claim

1. A process for cutting parts from pieces of sheet material, such as hides, having irregularly shaped and sized peripheries, said process comprising the steps of: applying a piece of sheet material in spread condition to a support surface, digitizing the periphery of said piece while it is positioned on said support surface to obtain periphery data digitally representing said periphery, supplying said periphery data to a layout apparatus including a display screen and a memory containing digital representations of parts to be cut from said pieces, displaying a visual representation of the periphery of said piece of sheet material on said display using said periphery data to define said visual representation, selecting digital part representations from said memory, displaying said selected digital part representations on said screen and arranging them within said visual representation of the periphery of said piece as displayed on said screen until arriving at an acceptable layout, producing layout data digitally representing said acceptable layout, using said layout data to cut said piece of sheet material while it remains on said support surface, and then removing said cut piece from said support surface, replacing it with a new piece and repeating the aforementioned steps with respect to said new piece.

2. The process of claim 1 further characterized by also digitizing while said piece of sheet material is received on said support surface, blemishes contained by said piece to provide digital blemish data, supplying said digital blemish data to said layout apparatus and using it to display visual representations of the blemishes on said display screen along with the visual representation of the periphery of said piece, and during said step of arranging the visual part representations on said screen, arranging said visual part representation so that the blemishes fall either into waste areas of the piece or into noncritical areas of the part representations.

3. A process for cutting parts from pieces of sheet material, such as hides, having irregularly shaped and sized peripheries, said process comprising the steps of: applying a piece of sheet material in spread condition to a support surface, digitizing the periphery of said piece while it is positioned on said support surface to obtain periphery data digitally representing said periphery, supplying said periphery data to a layout apparatus including a display screen and a memory containing digital representations of parts to be cut from said pieces, displaying a visual representation of the periphery of said piece of sheet material on said display using said periphery data todefine said visual representation, inspecting said piece of sheet material to determine boundaries between zones of different thickness, also digitizing said piece of sheet material while it is received on said support surface along said boundaries to provide digital thickness zone boundary data, supplying said boundary data to said layup apparatus and using it to display visual representations of siad boundaries on said screen along with the representation of the periphery of said piece, selecting digital part representations from said memory, displaying said selected digital part representations on said screen and arranging them within said visual representation of the periphery of said piece as displayed on said screen until arriving at an acceptable layout, said digital part representations stored in memory having differing thickness requirements, and during said step of arranging such part representations on said screen arranging each part representation within a thickness zone suiting its thickness requirement, producing layout data digitally representing said acceptable layout, using said layout data to cut said piece of sheet material while it remains on said support surface, and then removing said cut piece from said support surface, replacing it with a new piece and repeating the aforementioned steps with respect to said new piece.

4. The process defined in claim 1 further characterized by said step of digitizing the periphery of said piece while it is positioned on said support surface being performed using an automatic edge following digitizer.

5. The process of claim 1 further characterized by the support surface onto which said sheet is applied being the outer surface of a generally cylindrical rotary drum.

6. The process of claim 1 further characterized by holding said piece of sheet material to the outer surface of said drum during said digitizing step and during said cutting step by means of a vacuum applied to the undersurface of said sheet through the outer surface of said drum.

7. The process as defined in claim 6 further characterized by, after the cutting of said piece, terminating the application of vacuum to the undersurface of said piece and thereafter applying air at positive pressure through said outer surface of said drum to blow the cut piece from the outer surface of the drum onto an associated takeaway conveyor.

8. An apparatus for cutting irregularly shaped and sized pieces of sheet material, such as hides, said apparatus comprising: a digitizing and cutting unit, a layout unit, and a control means for controlling the operation of said digitizing and cutting unit, said digitizing and cutting unit including a stationary frame, a drum supported by said frame for rotation about its central axis relative to said frame and having an outer generally cylindrical surface for supporting a piece of sheet material in spread condition, a digitizer supported by said frame for movement in two coordinate directions relative to said outer surface of said drum for digitizing features of a piece of sheet material supported on said outer surface, and a cutter supported by said frame for movement in two coordinate directions relative to said outer surface of said drum for cutting parts from a piece of sheet material supported on said outer surface, said layout apparatus including a display screen for displaying a representation of the periphery of the piece of sheet material supported on said outer surface of said drum based on periphery data supplied by said digitizer and also for displaying representations of blemishes appearing in the piece of sheet material spread on said outer surface of said drum based on blemish data supplied by said digitizer, a memory storing digital representations of parts to be cut from said sheet, and means under control of an operator for interactively selecting part representations from said memory and for displaying visual representations of the same on said screen and for arranging them in different orientations and at different locations on said screen, thereby allowing the operator to arrive at such a final overall selection and arrangement of parts to be cut from said piece as fits neatly within said piece with low waste of material and as avoids the blemishes which appear on said sheet, said control unit being operable to control said cutter to cut parts from the piece of sheet material supported on said outer surface of said drum in accordance with said final selection and arrangement of parts

9. The apparatus defined in claim 8 further characterized by said drum having a means for applying vacuum through said outer surface to hold a piece of sheet material to it by vacuum applied to the undersurface of the piece.

10. The apparatus defined in claim 9 further characterized by means for applying air at positive pressure through said outer surface of said drum after a cutting operation is completed to assist in the removal of cut parts and waste material from said drum.

11. The apparatus as defined in claim 8 further characterized by said outer surface of said drum being penetrable and said cutter being one using a reciprocating knife which penetrates into said penetrable outer surface during a cutting operation.

12. The apparatus as defined in claim 8 further characterized by a subframe supported by said stationary frame for rotation relative to said stationary frame around said central axis of said cylinder, said subframe including an elongated beam located adjacent and outwardly of said outer generally cylindrical surface of said drum and arranged parallel to said central axis, said digitizer being supported on said beam for movement along the length thereof in one coordinate direction relative to said outer surface of said cylinder, movement of said subframe about said central axis of said cylinder relative to said cylinder moving said digitizer in a second coordinate direction relative to said outer surface of said cylinder.

13. The apparatus as defined in claim 12 further characterized by said stationary frame including an elongated stationary beam located adjacent and outwardly of said outer surface of said drum and arranged parallel to said central axis of said drum, said cutter being supported on said stationary beam for movement along the length thereof in one coordinate direction relative to said outer surface of said drum, movement of said drum about its central axis relative to said stationary frame moving said digitizer relative to said outer surface of said drum in a second coordinate direction.

* * * * *